United States Patent [19]
Ahmed et al.

[11] Patent Number: 5,993,653
[45] Date of Patent: *Nov. 30, 1999

[54] COMPOSITION AND COLUMN USED IN HPLC

[75] Inventors: Faizy Ahmed, Foothill Ranch, Calif.; Toshihiko Hanai, Yokohama, Japan

[73] Assignee: Phenomenex, Torrance, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/909,267

[22] Filed: Aug. 11, 1997

[51] Int. Cl.$^6$ .................................................. B01D 15/08
[52] U.S. Cl. .................................. 210/198.2; 210/502.1; 210/635; 210/656; 502/401
[58] Field of Search ..................... 210/635, 656, 210/659, 198.2, 502.1; 502/401, 402

[56] References Cited

U.S. PATENT DOCUMENTS

| | | | |
|---|---|---|---|
| 3,960,720 | 6/1976 | Porath | 210/198.2 |
| 4,544,499 | 10/1985 | Tran | 210/682 |
| 4,867,884 | 9/1989 | Rendleman | 210/635 |
| 5,011,608 | 4/1991 | Damjanovic | 210/198.2 |
| 5,252,216 | 10/1993 | Folena-Wasserman | 210/635 |
| 5,429,746 | 7/1995 | Shadle | 210/635 |
| 5,431,807 | 7/1995 | Frechet | 210/198.2 |

OTHER PUBLICATIONS

Mikes' Laboratory Handbook of Chromatographic and Allied Methods, John Wiley & Sons, 1979, New York, p. 157.
Snyder, Introduction to Modern Liquid Chromatography, John Wiley & Sons, 1979, New York, p. 275.

*Primary Examiner*—Ernest G. Therkorn
*Attorney, Agent, or Firm*—Knobbe Martens Olson & Bear, LLP

[57] ABSTRACT

An alkyl-phenyl bonded a stationary phase for use in reversed-phase liquid chromatography, having five to ten carbon atoms in the alkyl group, is disclosed. The alkyl-phenyl bonded phase has its unique selectivity, and it is chemically stable in both acidic and basic environments as well as having high retention capacity, hence high resolution. A method for preparing the alkyl-phenyl bonded phase and a column inside of which the alkyl-phenyl bonded phase is packed with are also disclosed. Additionally, a method for performing liquid chromatography and a mixed stationary phase which has more than one alkyl-phenyl phases are disclosed.

4 Claims, 8 Drawing Sheets

$$Si-OH + X_n-Si-(CH_2)_6-Ph$$
$$R_m$$

R=CH$_3$ OR OTHER ALKYL GROUPS
AND m=0,1,2

X=Cl  AND  n=3,2,1

SCHEMATIC REPRESENTATION OF THE SYNTHESIS OF HEXYLPHENYL BONDED SILICA GEL.

R=CH$_3$ OR OTHER ALKYL GROUPS
AND m=0,1,2

X=Cl   AND n=3,2,1

SCHEMATIC REPRESENTATION OF THE SYNTHESIS
OF HEXYLPHENYL BONDED SILICA GEL.

COMPOSITION AND COLUMN USED IN HPLC

BACKGROUND OF THE INVENTION

1. Field of the Invention

The present invention relates generally to reversed-phase liquid chromatography. More specifically, the present invention relates to a chemical composition used as a stationary phase in the reversed-phase liquid chromatography, a method for preparing the composition, a column used in the liquid chromatography, and a method for performing the liquid chromatography.

2. Description of Related Art

Reversed-phase liquid chromatography is the most popular separation method in liquid chromatography. More than 50 percent of all the applications in liquid chromatography are performed in reversed-phase mode. This popularity stems from a number of factors such as ease of use, rapid analysis time, and commercial availability of a large number of reversed-phase columns. Besides, the theory of reversed-phase liquid chromatography is also very well developed.

Early, many of the reversed-phase systems were developed using silica gel as the stationary phase matrix. However, conventional silica gel based packing materials have several disadvantages.

One disadvantage relates to the presence of acidic/active silanol groups. The presence of unreacted silanol groups lead to the adsorption of basic chemicals on the column, resulting sometimes in tailing peaks or complete disappearance. To alleviate this, the use of masking agents like alkylamine or the use of low pH mobile phases which would protonate the silanols became common practice.

Another disadvantage relates to pH stability. Conventional silica gel based packing materials have limited range of pH stability (2.5 to 7.5). At low pH, the silica-carbon bonds break down leading to the erosion of the bonded phase. At high pH, on the other hand, the silica gel itself dissolves, resulting in a loss of bonded phases. In both these instances, there is a change in the chromatographic profile. Recently, silica-based allys bonded phases which are stable to extended range of pH have been synthesized. Popular alkyl bonded phases are pentyl, octyl, and octadecyl bonded silica gels (respectively C5, C8, and C18) which are stable in the range of pH 1.5 to 10.0.

The separation power of liquid chromatography, on the other hand, can be attributed to the unlimited selectability of mobile phase conditions. The optimal utilization of the power of liquid chromatography requires development of new stationary phases. In this regard, another popular phase in reversed-phase liquid chromatography which has different and unique selectivities compared to the alkyl (C5, C8, and C18) bonded phases is phenyl phase ($C_n$Ph). Certain phenyl bonded phases have been developed and their phenyl groups are generally bound with silica gel via zero to four methylene groups; i.e., n=0, 1, 2, 3, or 3 in ($C_n$Ph). However, these phases have limited pH stability and show poor retention capacity compared with the octyl (C8) and octadecyl (C18) bonded phases.

As a result, there is a need for a new phenyl bonded phase that has high pH stability at both extremes and improved retention capacity compared with the conventional alkyl bonded phases, hence better resolution.

SUMMARY OF THE INVENTION

The aforementioned needs are satisfied by several aspects of the present invention. One aspect of the present invention provides a chemical composition for use as a stationary phase in reversed-phase liquid chromatography, comprising a polymer-based chromatographic support which comprises chemically stable and porous particles having a surface, the surface of said particles having alkyl-phenyl bonded thereto, wherein said alkyl-phenyl has from five to ten methylene groups in the alkyl group.

Another aspect of the present invention provides a column for separating a plurality of different chemicals in a sample, said column comprising a hollow tube with two open ends and a composition of alkyl-phenyl bonded stationary phase packed inside said hollow tube, wherein said alkyl-phenyl has from five to ten methylene groups in the alkyl group.

Another aspect of the present invention provides a method for preparing a desired alkyl-phenyl bonded silica gel, wherein said alkyl-phenyl has five to ten methylene groups in the alkyl group, comprising reacting silica gel with a reactive alkyl-phenylsilane, wherein the alkyl group of said reactive alkyl-phenylsilane has the same number of methylene groups in the alkyl group as said desired alkyl-phenyl bonded silica gel has.

Further aspect of the present invention provides a method for separating a plurality of different chemicals in a sample comprising said different chemicals, said method comprising the steps of: preparing an alkyl-phenyl bonded stationary phase, comprising a polymer-based chromatographic support which comprises chemically stable and porous particles having a surface, the surface of said particles having alkyl-phenyl bonded thereto, wherein the alkyl group of said alkyl-phenyl has from five to ten methylene groups in the alkyl group; packing said alkyl-phenyl bonded stationary phase inside a column; injecting said sample comprising a plurality of different chemicals into a first end of the column; and applying liquid flow into said first end of said column, thereby forcing said sample through said column and out of a second end of said column, whereby said different chemicals come out of said second end of said column at different times.

More further aspect of the present invention provides a composition for use as a stationary phase in reversed-phase liquid chromatography, comprising a polymer-based chromatographic support which comprises chemically stable and porous particles having a surface, wherein said surface of said particles has two or more different alkyl-phenyls bonded thereto, wherein said alkyl-phenyls have from five to ten methylene groups in their alkyl groups.

DETAILED DESCRIPTION OF THE PREFERRED EMBODIMENTS

We analyzed the molecular and chromatographic properties of phenyl bonded phases, attached to silica gel via one to twelve methelene groups by calculating the log P values thereof. The calculation of log P value is disclosed in R. F. Rekker, "The hydrophobic fragmental constant", Elsevier, Amsterdam, (1997) which is hereby incorporated herein by reference. The calculated log P values based on Rekker's fragmental constants for different functional groups are summarized in TABLE 1.

The log P values of bonded phases indicate the retention capacity and the chemical stability. The log P values of chemically unstable phases, such as propyl-phenyl, propyl-amino, propyl-cyano, and butyl-groups are small, and these phases show lesser retention and lower stability. The larger log P values mean higher hydrophobicity, and lead to longer retention and higher stability of the bonded phase.

The low retentivity and stability of the conventional phenyl phases are the result of short alkyl chains, e.g. methyl, ethyl, and propyl used in attaching the phenyl group on the surface of the silica gel. Because of this low hydrophobicity, the unique selectivity of the phenyl phases cannot be fully realized. The reason for the instability of the short chain bonded phase can be understood from the effect of alkyl chain length on hydrogen bonding capacity of alkanols. Up to four methylene units (butyl groups) the hydrogen bonding capability of hydroxy groups is affected by the alkyl chain length, but the longer alkyl chain does not further affect the hydrogen bonding capability. As such, the butyl bonded phase is not stable in high pH solutions, but the stability of pentyl bonded phases is equivalent to octyl and octadecyl bonded phases.

The analysis of the properties of bonded phases of silica gels from their molecular masses and log P values, as seen in Table 1, indicate that alkyl-phenyl bonded phases having 4 to 10 methylene groups in their alkyl group should theoretically lead to better stability and selectivity than propyl-phenyl, ethyl-phenyl, or methyl-phenyl bonded phase. Preferably, alkyl-phenyl bonded phase, having five to ten methylene groups in the alkyl group have high stability and selectivity. Most preferably, hexyl-phenyl has the ideal stability and selectivity.

Figure 1:
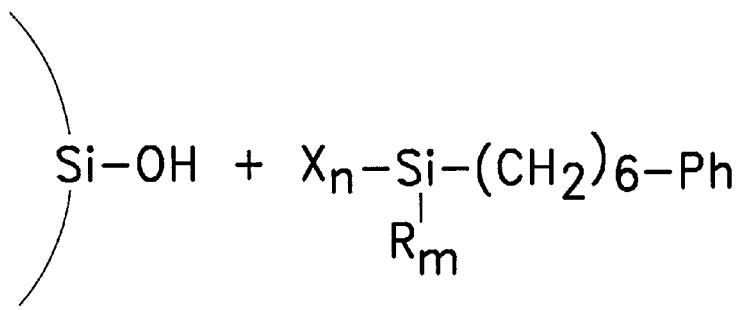
FIG. 1 shows schematic reaction for synthesis of an alkyl-phenyl bonded silica gel.

We prepared the alkyl-phenyl bonded silica gels and tested its stability and separation power compared to the other alkyl bonded phases. According to the present invention, alkyl-phenyl bonded silica gels can be synthesized using a variety of silylating reagents. The synthesis was carried out by reacting a mono-, di-, or tri-functional alkyl-phenylsilane with the silanol groups of silica gels in a suitable media under high temperature as depicted in FIG. 1. The functional groups are good leaving group such as halogens, methoxy, ethoxy, etc, and the alkyl-phenylsilane having one to three leaving groups, hereinafter, is refered as a "reactive alkyl-phenylsilane".

The important aspect of the present invention is that the alkyl-phenyl bonded phases of the present invention shows chemical stability over extended pH range of 1.50 to 10.00 and has unique selectivity for the separation of organic molecules compared to other alkyl bonded phases. The stability and selectivity of alkyl-phenyl bonded phase of the present invention are not limited by the use of various polymer-based chromatographic supports such as silica gel, polystyrene divinylbenzene copolymer, polyhydroxymethacrylate, cellulose, etc. Additionally, various alkyl-phenyl bonded phases can be mixed to provide a mixed phase while maintaining their own selectivities and retaining capacities. In sum, the alkyl-phenyl bonded phases of the present invention have many advantages when applied to perform HPLC, in terms of its inertness (low silanophyllic activity), extended pH stability and unique selectivity.

EXAMPLE 1
Preparation of Alkyl-Phenyl Silica Gels and Columns Packed Therewith

In a typical experiment, twenty grams of the silica gel were washed with 0.1 N hydrochloric acid (HCl) on a filter funnel followed by distilled and dionized water till the pH of wash was neutral (nearly 7.0). The silica gel was then washed with acetone and dried in an oven at 80° C. under vacuum for 10 hours.

A dry 500 mL capacity round bottom flask was set up in a fume hood, and 20 grams of hexyl-phenyl methyldichlorosilane as a silytating agent for obtaining hexyl-phenyl bonded phase and 200 mL of dry toluene were added to it. The two were mixed thoroughly and the twenty grams of dried silica gel were added to the reaction mixture while continuously stirring the mixture. The flask was then attached to a condenser with water circulating through it and heated to boiling using a heating mantle. After allowing the reaction to proceed for 18 hours, the flask was cooled and the silica gel which had hexyl-phenyl group on the surfaces was filtered. The hexyl-phenyl bonded silica gel was then washed with 100 mL dichloromethane, 100 mL methanol and 100 mL acetone and dried under vacuum at 80° C. A similar reaction and procedure were carried out to prepare propyl-phenyl bonded silica gel.

After the bonding step, the unreacted silanol groups on the surface of the silica gel were blocked by an end-capping step as follows: the bonded silica gel was added to a mixture of 40 mL of trimethylchlorosilane and 200 mL of toluene in a round bottom flask and reacted for 18 hours. At the end of the reaction, the silica gel was subjected to the washing/drying procedures as described earlier in the bonding step.

The end-capped hexyl-phenyl and propyl-phenyl bonded silica gels were packed into two individual 150 mm L×4.6 mm I.D. columns for the chromatographic evaluation.

Similar reactions and procedures are carried out to prepare other alkyl-phenyl bonded silica gels which have 4, 5, 7, 8, 9, or 10 methylene groups in their alkyl groups, to end-cap unreacted silanols on their surfaces, and to provide columns inside of which is packed with the alkyl-phenyl bonded silica gels.

All the organic solvents used in the reaction were obtained from J. T. Baker A.; (Phillipsburg, N.J., USA). The organosilane reagents were from Silar Laboratories (Wilmington, N.C., USA). The silica gel used was obtained from Phenomenex, Inc. (Torrance, Calif., USA) and had the following specifications: 5 $\mu$m dp, with 100 Å average pore diameter and 400 m$^2$/g surface area.

EXAMPLE 2
Inertness and Chemical Stability of Alkyl-Phenyl Bonded Phases

The inertness and the chemical stability of the synthesized hexyl-phenyl bonded silica gel were studied by looking at the rention factors and peak shapes of pyridine, benzoic acid, 8-hydroxyquinoline, and naphthalene disclosed in T. Hanai, Encyclopedia of Analytical Science (1995), Academic Press, London, p. 2558–1567 which is hereby incorporated herein by reference. The retention factor, in terms of measured parameters, is "$k=(t_R-t_O)/t_O$": where $t_R$ is retention time of the measured peak; and $t_O$ is retention time of non-retained component.

Figure 2A:
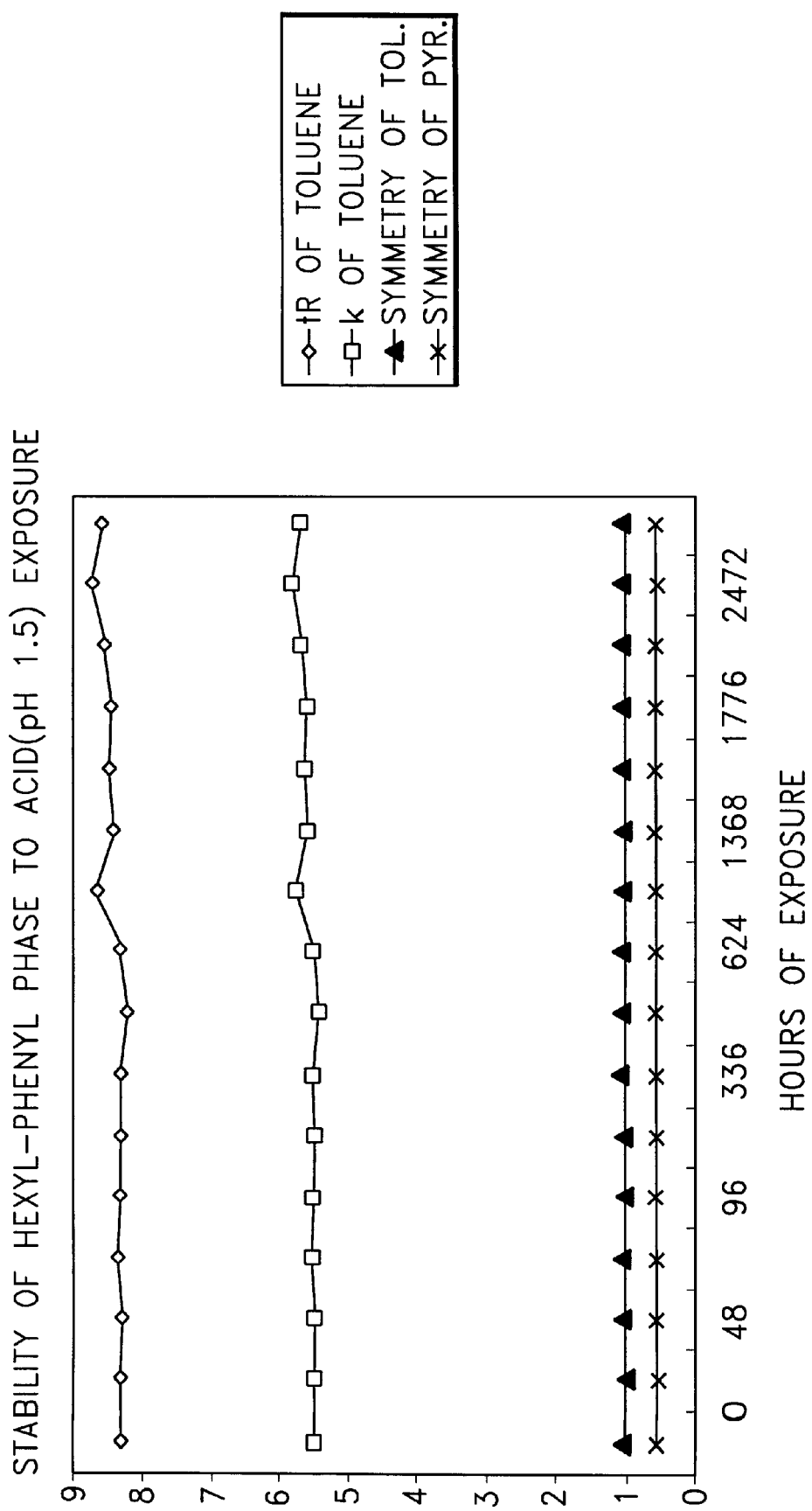
FIG. 2A and 2B show the effect of pH on the stability of hexyl-phenyl bonded silica gel.
Figure 2B:
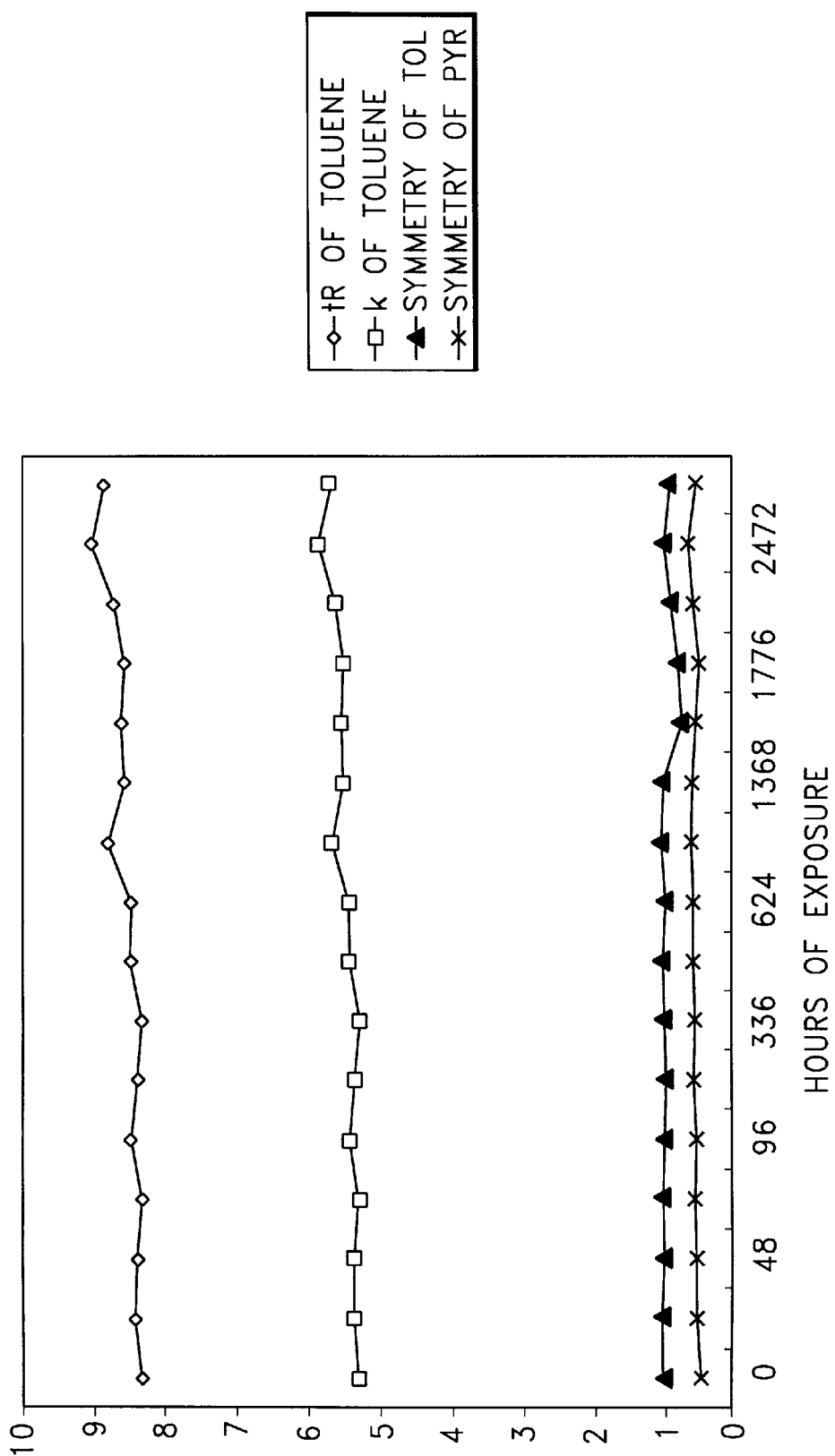

The plots 20 and 25 in FIGS. 2A and 2B show chemical stability of hexyl-phenyl bonded phase in acidic and basic solutions. The lines 21 and 26 indicate retention time ($t_R$) for toluene, and the lines 22 and 27 represent retention factors (k) for toluene in acidic and basic solutions respectively. The lines 23 and 28 indicate peak asymmetry for toluene, and the lines 24 and 29 for pyridine. Asymmetry is a factor describing the shapes of chromatographic peaks, and the factor is the ratio of the distance between the peak apex and the back side of the chromatrographic curve and the front side of the curve at 10% peak height. As shown in FIGS. 2A and 2B, the retention time and retention factor for toluene was almost constant in continuous operation of more than 2,500 hours (more than 60,000 column volumes) both in 10 mM sodium phosphate buffer (pH 10) and 0.1% trifluoro acetic (pH 1.5) solutions. In addition, the peak shapes of toluene and pyridine were almost symmetric. The surface was also inert for trace metal sensitive test using 8-hydroxyquinoline, thereby showing a low level of metal contamination.

EXAMPLE 3
Retention Capacity of Alkyl-Phenyl Bonded Phases

The retention capacities of alkyl-phenyl bonded silica gels were compared from the retention factors for alkylbenzenes and polycyclic aromatic hydrocarbons (PAH). The log k values of benzene, 16 PAHs, and 10 alkylbenzenes for different bonded phases are listed in Table 2.

Figure 3:
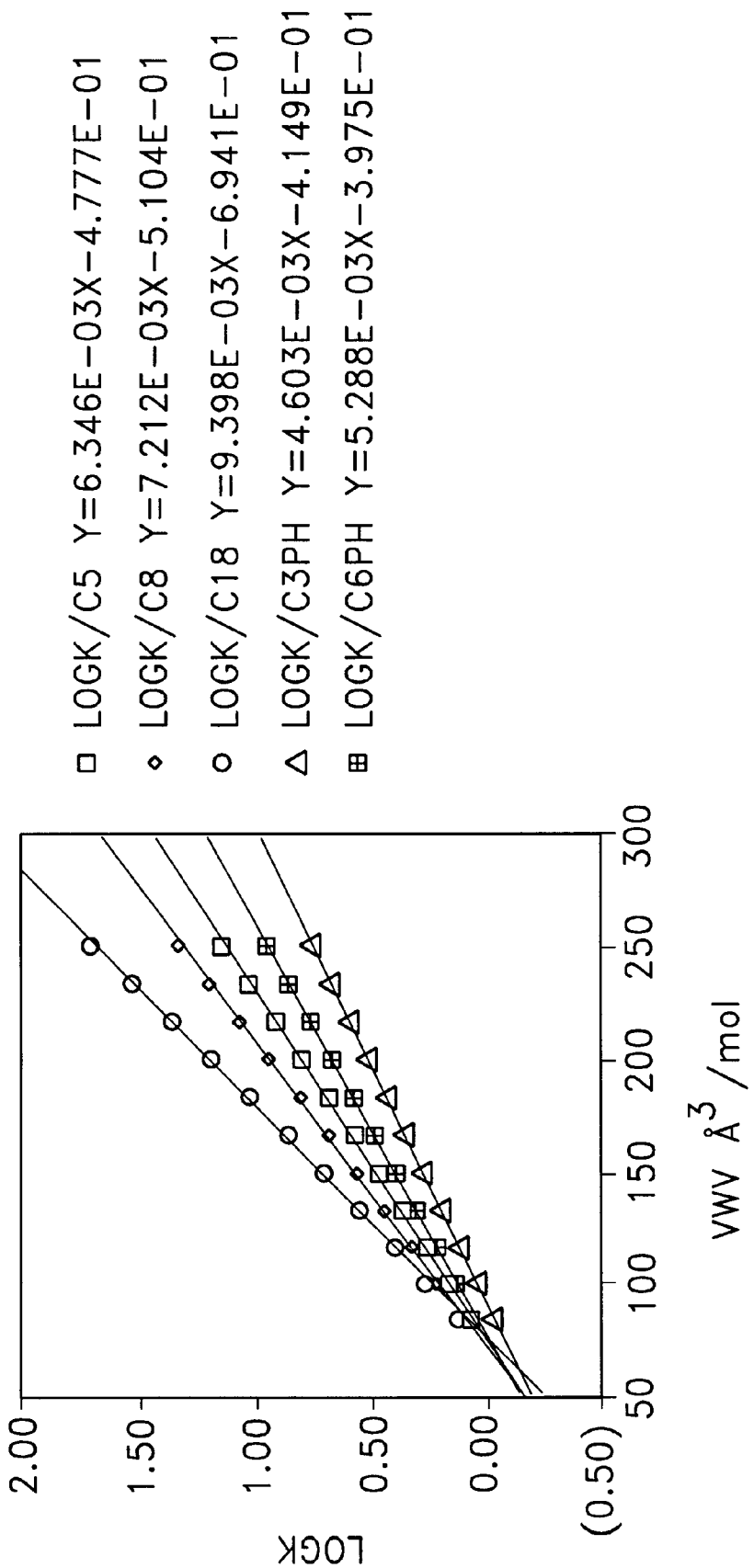
FIG. 3 is a plot for showing selectivities of alkyl (C5, C8, and C18) and alkyl-phenyl (C3Ph and C6Ph) bonded phase for alkylbenzenes in 80% acetonitrile.

The log k values of alkylbenzenes were measured by reversed-phase liquid chormatography in aqueous 80% acetonitrile at 40° C. The log k values were used for the analysis of hydrophobicity of bonded phases using van der Waals volumes of analytes as the standard. The relations between log k values and van der Waals volumes of alkylbenzenes in different bonded phases are shown in FIG. 3. The relations indicate that the retention capacities related to hydrophobicity of hexyl-phenyl and propyl-phenyl bonded phases (respectively C6Ph and C3Ph) were less than that of the pentyl bonded phase (C5). The relation between their slope and alkyl chain length was: Alkyl chain length=4.321× (slope)−22.729, $r^2$=0.997(n=3).

Figure 4A:
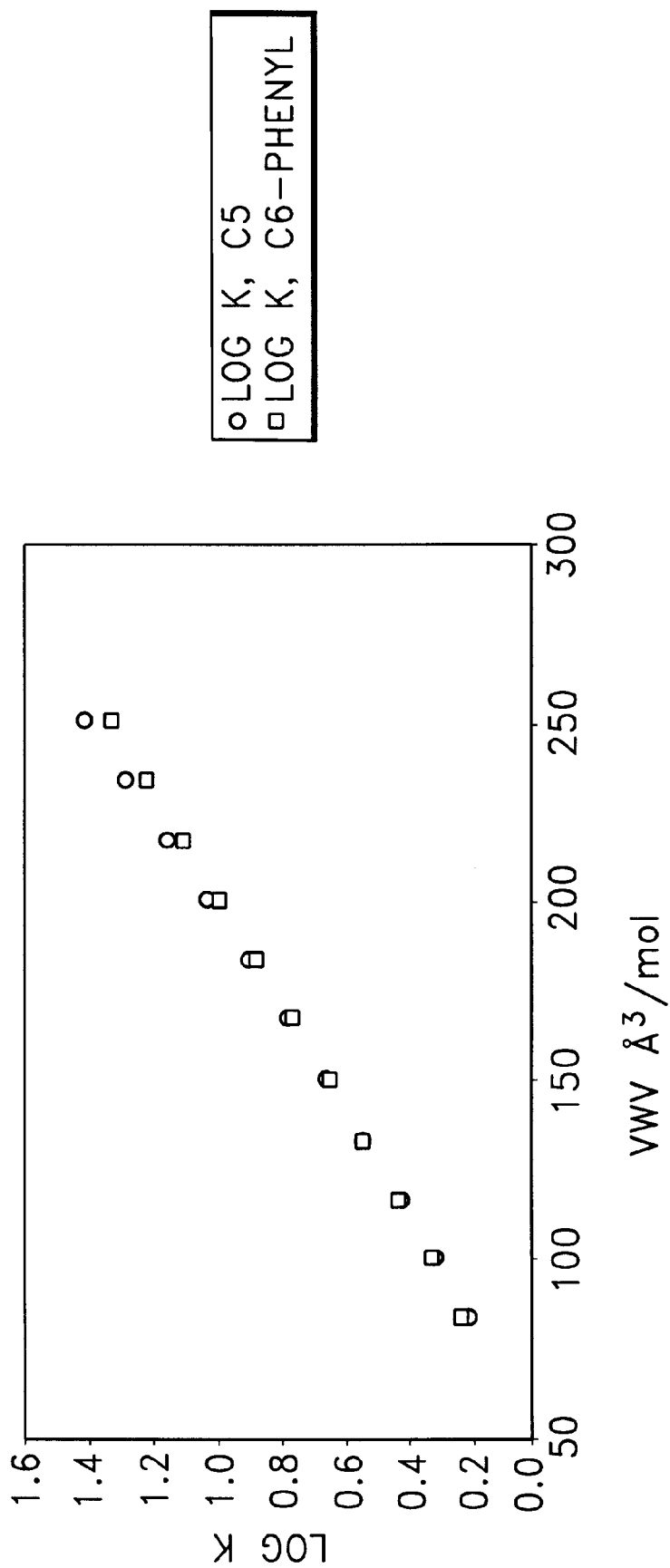
FIG. 4A and 4B show the selectivities of pentyl (C5) and hexyl-phenyl (C6Ph) bodned phases for alkylbenzenes in 70% and 80% aqueous acetonitrile respectively.
Figure 4B:
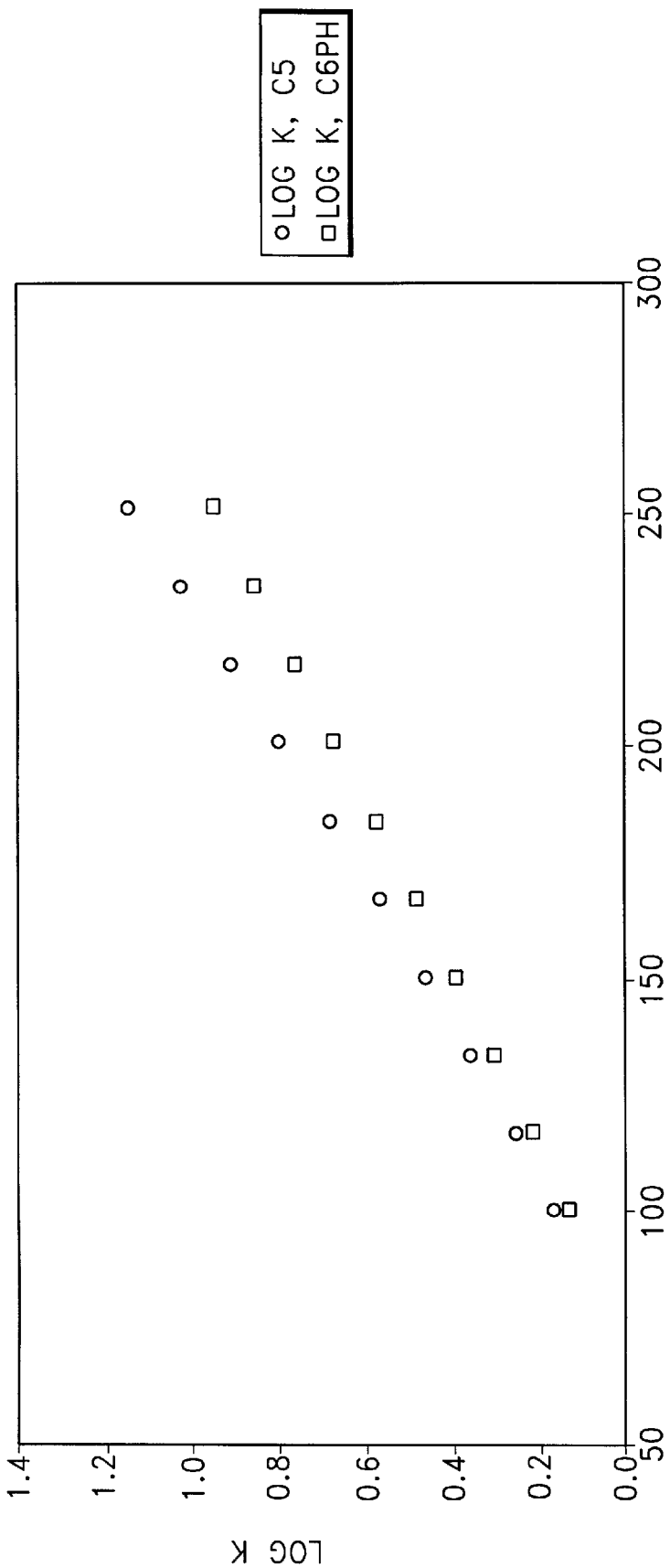
Figure 5:
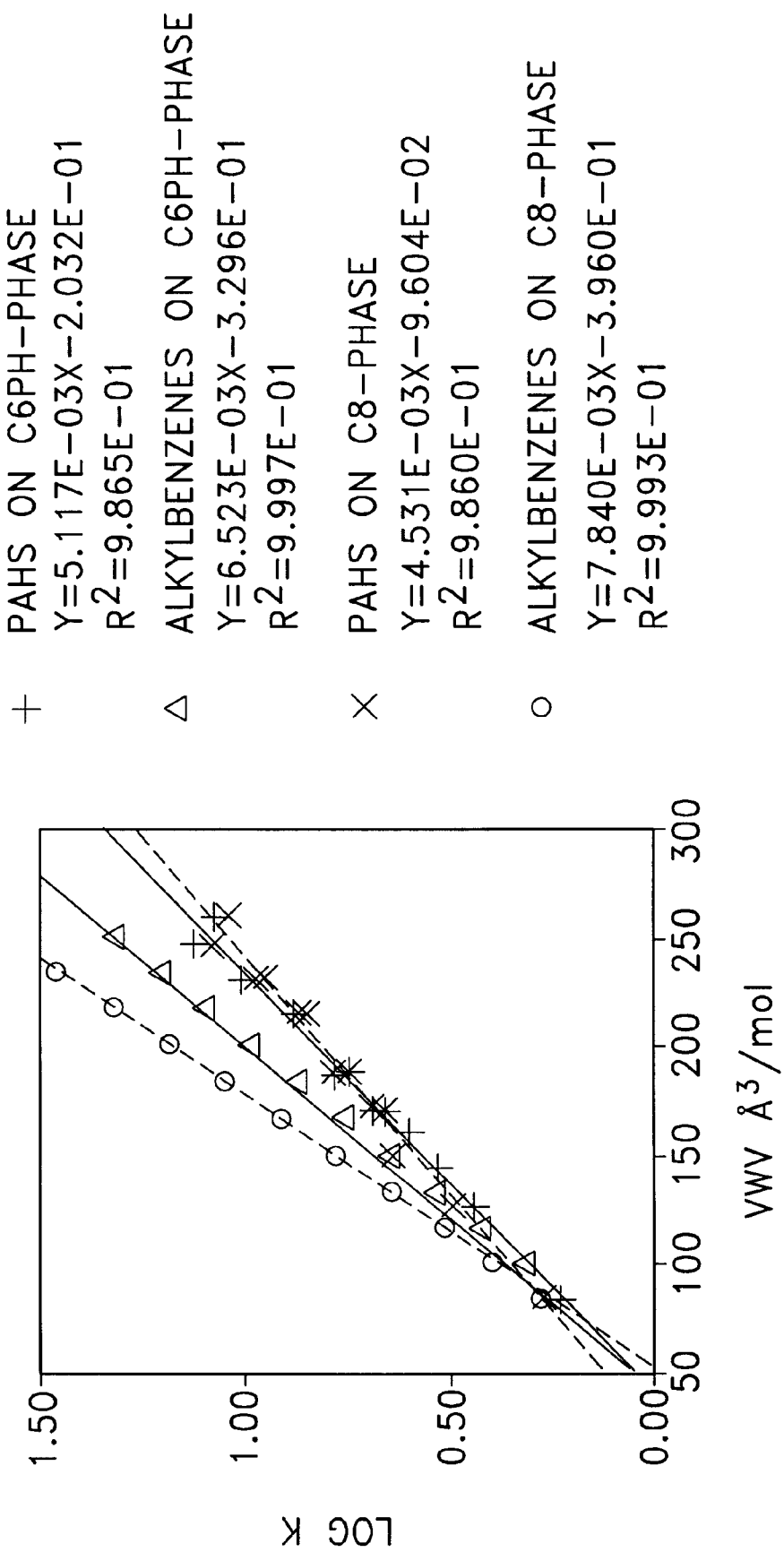
FIG. 5 is a plot for comparing the selectivities of octyl (C8) and hexyl-phenyl (C6Ph) bonded phases for alkylbenzenes and polyaromatic hydrocarbons (PAH).

The retention capacity of synthesized hexyl-phenyl bonded phase (C6Ph) for alkylbenzenes in 70% aqueous acetonitrile was equivalent to that of pentyl bonded phase (C5) as shown in FIG. 4A; however, that for polycyclic aromatic hydrocarbons (PAH) on C6Ph was equivalent to that of octyl bonded phase (C8) as shown in FIG. 5. As shown in FIG. 4B, pentyl bonded phase (C5) is slightly more retentivity than hexyl-phenyl bonded phased (C6Ph) in 80% aqueous acetonitrile. Advantageously, the difference in retentivity seen with different solvents can be used to effect better separation simply by changing solvents.

When the retention time of alkylbenzenes was used as the standard, the ratios of the slopes for the plot of log k values and van der Waals volumes indicated the difference of retention capacity of these bonded phases (calculated from FIG. 5). The retention capacity for alkylbenzenes was 1.27 (6.523/5.117) times greater than that for PAH on C6Ph phase. The retention capacity for alkylbenzenes was 1.73 (7.840/4.531) times greater than that for PAH on C8 phase. This means that PAHs were retained 1.36 (1.73/1.27) times on C6Ph phase than on C8 phase.

EXAMPLE 4
Selectivity of Hexyl-Phenyl Bonded Phase for Antibacterial Drugs

Figure 6:
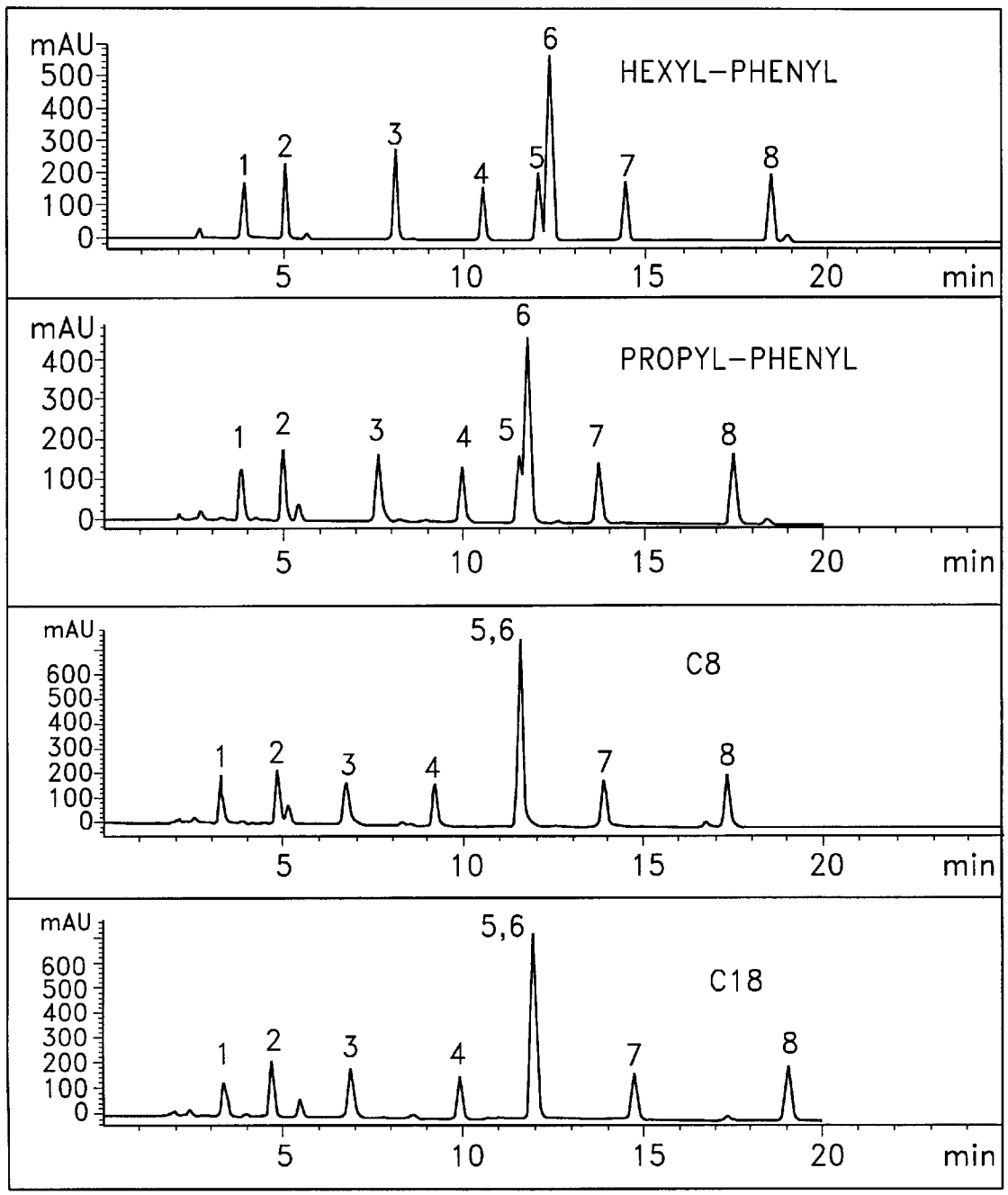
FIG. 6 shows a result of separating antibacterial drugs hexyl-phenyl (C6Ph), propyl-phenyl (C3Ph), octyl (C8), and octadecyl (C18) bonded phases.

The selectivities of the alkyl-phenyl and alkyl bonded phases were examined for the separation of antibacterial drugs. The mixtures of carbadox, thiamphenicol, furazolidone, oxolinic acid, sulfadimethoxine, sulfaquinoxaline, nalidixic acid and piromidic acid were chromatographed using potassiumdihydrogen phosphate and acetonitrile mixtures. The total elution time was about 20 minutes in C3Ph, C6Ph, C8, and C18 bonded phases as shown in FIG. 6. The perfect resolution between sulfadimethoxine and sulfaquinoxaline was achieved only on C6Ph phase, and the separation of these two compounds was not possible on C8 and C18 phases.

In conclusion, such selective retention capability of phenyl bonded phases can expand the separation power in reversed-phase liquid chromatography. An eluent for C8 bonded phase can be easily applied to C6Ph phase for the further separation. Such two-dimensional chromatograms can speed up the analysis of complex mixtures. Above results also indicate that hexadecyl-phenyl bonded phase will be a compatible phase to C12 bonded phase for improving separation power in reversed-phase liquid chromatography.

The computer used for the molecular calculations were Macintosh 8100/100 running the CAChe™ program including ProjectLeader™ from Sony-Tektronix (Tokyo). Rlog P values were calculated by a method based on that proposed by Rekker. The van der Waals volumes were calculated by MOPAC-Blog P program provided by Sony-Tektronix. The molecules were first optimized by molecular mechanics calculation, and optimized again by MOPAC, then their van der Waals volumes and log P values were obtained with the Blog P program disclosed in CAChe Manual, Sony-Tektronix, (1995) which is hereby incorporated herein by reference. Properties for the calculation were selected according to the manual from CAChe Scientific.

The liquid chromatograph was a model HP 1090 from Hewlett-Packard (Palo Alto, Calif., USA), and the chemically-bonded silica gel columns, −C18, −C8 and −C5, −C6Ph, −C3Ph, 15 cm×4.6 mm I.D., were from Phenomenex Inc. (Torrance, Calif., USA). Chemicals used were from Aldrich and ChemService. HPLC grade acetonitrile and water were from Fisher Scientific (Tustin, Calif., USA).

TABLE 1

Log P Values of Bonded Groups

| CHEMICAL NAME | STRUCTURE | LOG P |
|---|---|---|
| Phenyl | (—Ph) | 1.89 |
| Methyl-phenyl | —$CH_2Ph$ | 2.42 |
| Ethyl-phenyl | —$(CH_2)_2Ph$ | 2.95 |
| Propyl-phenyl | —$(CH_2)_3Ph$ | 3.46 |
| Butyl-phenyl | —$(CH_2)_4Ph$ | 3.99 |
| Hexyl-phenyl | —$(CH_2)_6Ph$ | 5.05 |
| Octyl-phenyl | —$(CH_2)_8Ph$ | 6.09 |
| Decyl-phenyl | —$(CH_2)_{10}Ph$ | 7.15 |
| Dodecyl-phenyl | —$(CH_2)_{12}Ph$ | 8.21 |
| Methyl or C1 | —$CH_3$ | 0.70 |
| Ethyl or C2 | —$CH_2CH_3$ | 1.40 |
| Propyl or C3 | —$CH_2CH_2CH_3$ | 2.10 |
| Butyl or C4 | —$CH_2CH_2$—$CH_2CH_3$ | 2.93 |
| Octyl or C8 | —$(CH_2)_7CH_3$ | 4.41 |
| Octadecyl or C18 | —$(CH_2)_{17}CH_3$ | 9.01 |
| Cyano | —$(CH_2)_3CN$ | 0.52 |
| N-Methyl-N-cyanoethyl | —$N(CH_3)(CH_2)_2CN$ | −1.46 |
| Propyl amino | —$(CH_2)_3NH_2$ | 0.16 |
| Butyl amino | —$(CH_2)_4NH_2$ | 0.69 |

TABLE 2 van der Waal's Volumes and Log K Values of PAH and Alkylbenzenes

| Ethylbenzene | 117.067 | 0.417 | 0.513 | 0.628 | 0.348 | 0.428 | 0.258 | 0.324 | 0.394 | 0.121 | 0.215 |
|---|---|---|---|---|---|---|---|---|---|---|---|
| Propylbenzene | 133.897 | 0.537 | 0.644 | 0.800 | 0.449 | 0.538 | 0.362 | 0.442 | 0.548 | 0.196 | 0.303 |
| Butylbenzene | 150.713 | 0.653 | 0.776 | 0.963 | 0.548 | 0.648 | 0.462 | 0.561 | 0.702 | 0.274 | 0.391 |
| Pentylbenzene | 167.564 | 0.772 | 0.908 | 1.134 | 0.646 | 0.758 | 0.567 | 0.680 | 0.858 | 0.350 | 0.480 |
| Hexylbenzene | 184.315 | 0.894 | 1.043 | 1.310 | 0.747 | 0.871 | 0.679 | 0.806 | 1.021 | 0.430 | 0.572 |
| Heptylbenzene | 201.171 | 1.019 | 1.181 | 1.491 | 0.851 | 0.985 | 0.794 | 0.937 | 1.188 | 0.512 | 0.667 |
| Octylbenzene | 217.884 | 1.144 | 1.318 | 1.673 | 0.947 | 1.095 | 0.906 | 1.063 | 1.356 | 0.589 | 0.757 |
| Nonylbenzene | 234.706 | 1.271 | 1.457 | — | 1.046 | 1.204 | 1.022 | 1.193 | 1.528 | 0.668 | 0.849 |
| Decylbenzene | 251.540 | 1.400 | — | — | 1.146 | 1.313 | 1.139 | 1.324 | 1.697 | 0.748 | 0.941 | log k in 70% CH3CN

| PAH | VWV A3/mole | C5 | C8 | C18 | C3Ph | C6Ph |
|---|---|---|---|---|---|---|
| Benzene | 83.789 | 0.209 | 0.281 | 0.340 | 0.167 | 0.230 |
| Naphthalene | 127.598 | 0.410 | 0.486 | 0.582 | 0.305 | 0.470 |
| Acenaphthylene | 144.969 | 0.450 | 0.540 | 0.663 | 0.364 | 0.521 |
| Acenaphthene | 150.675 | — | 0.629 | 0.814 | 0.447 | 0.616 |
| Fluorene | 161.639 | 0.527 | 0.629 | 0.794 | 0.436 | 0.602 |
| Phenanthrene | 171.286 | 0.538 | 0.660 | 0.854 | 0.468 | 0.655 |
| Anthracene | 171.486 | 0.562 | 0.688 | 0.894 | 0.490 | 0.679 |
| Pyrene | 187.603 | 0.614 | 0.777 | 1.038 | 0.553 | 0.778 |
| Fluoranthene | 188.723 | 0.599 | 0.747 | 0.989 | 0.535 | 0.746 |
| Chrysene | 214.558 | 0.673 | 0.842 | 1.160 | 0.635 | 0.869 |
| Benzo(a)anthracene | 215.641 | 0.692 | 0.860 | 1.177 | 0.647 | 0.878 |
| Benzo(a)pyrene | 231.048 | 0.755 | 0.071 | 1.375 | 0.733 | 1.009 |
| Benzo(k)fluoranthene | 232.418 | 0.741 | 0.959 | 1.347 | 0.726 | 0.982 |
| Benzo(b)fluoranthene | 232.462 | 0.741 | 0.943 | 1.325 | 0.714 | 0.970 |
| Benzo(g,h,i)perylene | 247.198 | 0.822 | 1.067 | — | 0.799 | 1.118 |
| Dibenzo(a,h)anthracene | 259.435 | 0.803 | 1.032 | 1.479 | 0.806 | 1.071 |
| Indeno(1,2,3 cd)pyrene | 248.683 | 0.822 | 1.067 | — | 0.803 | 1.102 |

| | | log k in 70% CH3CN | | | | | log k in 80% CH3CN | | | | |
|---|---|---|---|---|---|---|---|---|---|---|---|
| Alkylbenzene | VWV A3/mole | C5 | C8 | C18 | C3Ph | C6Ph | C5 | C8 | C18 | C3Ph | C6Ph |
| Toluene | 100.456 | 0.312 | 0.396 | 0.489 | −0.253 | 0.326 | 0.170 | 0.225 | 0.267 | 0.049 | 0.137 |

What is claimed is:

1. A composition for use as a stationary phase in reversed-phase liquid chromatography, comprising a polymer-based chromatographic support which comprises chemically stable and porous particles having a surface, the surface of said particles having hexyl-phenyl bonded thereto, wherein said polymer-based chromatobraphic support is silica gel.

2. The composition of claim 1, wherein the surface of said particles additionally comprises silanols which are end-capped by a silylating agent.

3. The composition of claim 1, wherein the surface of the particles has at least one additional alkyl-phenyl bonded thereto, wherein said alkyl-phenyl has from five to ten methylene groups in the alkyl group.

4. The composition of claim 3, wherein the alkyl-phenyl comprises octyl-phenyl.

* * * * *

UNITED STATES PATENT AND TRADEMARK OFFICE
CERTIFICATE OF CORRECTION

PATENT NO. : 5,993,653
DATED : November 30, 1999
INVENTOR(S) : Ahmed Faizy

It is certified that error appears in the above-identified patent and that said Letters Patent is hereby corrected as shown below:

Column 1,
Line 41, please replace "allys" with -- alkyl --.
Line 56, please replace the second appearing "3" with -- 4 --.

Column 4,
Line 12, please replace "silytating" with -- silylating --.

Column 7, claim 1,
Line 6, please replace "polmer" with -- polymer --.
Line 6, please replace "chromatobraphic" with -- chromatographic --.

Columns 7 and 8,
Please replace Table 2 with the following table:

Signed and Sealed this

Twelfth Day of February, 2002

*Attest:*

JAMES E. ROGAN
*Attesting Officer*   *Director of the United States Patent and Trademark Office*

UNITED STATES PATENT AND TRADEMARK OFFICE
CERTIFICATE OF CORRECTION

PATENT NO. : 5,993,653
DATED : November 30, 1999
INVENTOR(S) : Ahmed Faizy (continued)

TABLE 2 van der Waal's Volumes and Log K Values of PAH and Alkylbenzenes

| PAH | VWV A3/mole | log k in 70% CH3CN | | | | |
|---|---|---|---|---|---|---|
| | | C5 | C8 | C18 | C3Ph | C6Ph |
| Benzene | 83.789 | 0.209 | 0.281 | 0.340 | 0.167 | 0.230 |
| Naphthalene | 127.598 | 0.410 | 0.486 | 0.582 | 0.305 | 0.470 |
| Acenaphthylene | 144.969 | 0.450 | 0.540 | 0.663 | 0.364 | 0.521 |
| Acenaphthene | 150.675 | — | 0.629 | 0.814 | 0.447 | 0.616 |
| Fluorene | 161.639 | 0.527 | 0.629 | 0.794 | 0.436 | 0.602 |
| Phenanthrene | 171.286 | 0.538 | 0.660 | 0.854 | 0.468 | 0.655 |
| Anthracene | 171.486 | 0.562 | 0.688 | 0.894 | 0.490 | 0.679 |
| Pyrene | 187.603 | 0.614 | 0.777 | 1.038 | 0.553 | 0.778 |
| Fluoranthene | 188.723 | 0.599 | 0.747 | 0.989 | 0.535 | 0.746 |
| Chrysene | 214.558 | 0.673 | 0.842 | 1.160 | 0.635 | 0.869 |
| Benzo(a)anthracene | 215.641 | 0.692 | 0.860 | 1.177 | 0.647 | 0.878 |
| Benzo(a)pyrene | 231.048 | 0.755 | 0.071 | 1.375 | 0.733 | 1.009 |
| Benzo(k)fluoranthene | 232.418 | 0.741 | 0.959 | 1.347 | 0.726 | 0.982 |
| Benzo(b)fluoranthene | 232.462 | 0.741 | 0.943 | 1.325 | 0.714 | 0.970 |
| Benzo(g,h,i)perylene | 247.198 | 0.822 | 1.067 | — | 0.799 | 1.118 |
| Dibenzo(a,h)anthracene | 259.435 | 0.803 | 1.032 | 1.479 | 0.806 | 1.071 |
| Indeno(1,2,3 cd)pyrene | 248.683 | 0.822 | 1.067 | — | 0.803 | 1.102 |

| Alkylbenzene | VWV A3/mole | log k in 70% CH3CN | | | | | log k in 80% CH3CN | | | | |
|---|---|---|---|---|---|---|---|---|---|---|---|
| | | C5 | C8 | C18 | C3Ph | C6Ph | C5 | C8 | C18 | C3Ph | C6Ph |
| Toluene | 100.456 | 0.312 | 0.396 | 0.489 | -0.253 | 0.326 | 0.170 | 0.225 | 0.267 | 0.049 | 0.137 |
| Ethylbenzene | 117.067 | 0.417 | 0.513 | 0.628 | 0.348 | 0.428 | 0.258 | 0.324 | 0.394 | 0.121 | 0.215 |
| Propylbenzene | 133.897 | 0.537 | 0.644 | 0.800 | 0.449 | 0.538 | 0.362 | 0.442 | 0.548 | 0.196 | 0.303 |
| Butylbenzene | 150.713 | 0.653 | 0.776 | 0.963 | 0.548 | 0.648 | 0.462 | 0.561 | 0.702 | 0.274 | 0.391 |
| Pentylbenzene | 167.564 | 0.772 | 0.908 | 1.134 | 0.646 | 0.758 | 0.567 | 0.680 | 0.858 | 0.350 | 0.480 |
| Hexylbenzene | 184.315 | 0.894 | 1.043 | 1.310 | 0.747 | 0.871 | 0.679 | 0.806 | 1.021 | 0.430 | 0.572 |
| Heptylbenzene | 201.171 | 1.019 | 1.181 | 1.491 | 0.851 | 0.985 | 0.794 | 0.937 | 1.188 | 0.512 | 0.667 |
| Octylbenzene | 217.884 | 1.144 | 1.318 | 1.673 | 0.947 | 1.095 | 0.906 | 1.063 | 1.356 | 0.589 | 0.757 |
| Nonylbenzene | 234.706 | 1.271 | 1.457 | — | 1.046 | 1.204 | 1.022 | 1.193 | 1.528 | 0.668 | 0.849 |
| Decylbenzene | 251.540 | 1.400 | — | — | 1.146 | 1.313 | 1.139 | 1.324 | 1.697 | 0.748 | 0.941 |

(12) REEXAMINATION CERTIFICATE (4484th)

United States Patent
Ahmed et al.

(10) Number: US 5,993,653 C1
(45) Certificate Issued: Nov. 6, 2001

(54) COMPOSITION AND COLUMN USED IN HPLC

(75) Inventors: Faizy Ahmed, Foothill Ranch, CA (US); Toshihiko Hanai, Yokohama (JP)

(73) Assignee: Phenomenex, Torrance, CA (US)

Reexamination Request:
No. 90/005,817, Sep. 7, 2000

Reexamination Certificate for:
Patent No.: 5,993,653
Issued: Nov. 30, 1999
Appl. No.: 08/909,267
Filed: Aug. 11, 1997

(51) Int. Cl.[7] .................................................. B01D 15/08
(52) U.S. Cl. ..................... 210/198.2; 210/502.1; 210/635; 210/656; 502/401
(58) Field of Search ..................... 210/635, 656, 210/659, 198.2, 502.1; 502/401, 402

(56) References Cited

PUBLICATIONS

The Synthesis and Characterization of Bonded Phase Chromatographic Adsorbents, Dennis Derek Blevins, 1982, The University of Arizona, A Dissertation Submitted to the Faculty of the Department of Chemistry—Included with this reference is a computer print out from the University of Arizona Library showing the catalog date of the reference is 1982. (Blevins' Thesis).

Silanes, Surfaces, and Interfaces, Proceedings of the Silanes, Surfaces, and Interfaces Symposium, Snowmass, Colorado, Jun. 19–21, 1985, pp. 403–411, written by T.S. Den and A. Kettrup (Den and Kettrup Article).

*Primary Examiner*—John Kim

(57) ABSTRACT

An alkyl-phenyl bonded a stationary phase for use in reversed-phase liquid chromatography, having five to ten carbon atoms in the alkyl group, is disclosed. The alkyl-phenyl bonded phase has its unique selectivity, and it is chemically stable in both acidic and basic environments as well as having high retention capacity, hence high resolution. A method for preparing the alkyl-phenyl bonded phase and a column inside of which the alkyl-phenyl bonded phase is packed with are also disclosed. Additionally, a method for performing liquid chromatography and a mixed stationary phase which has more than one alkyl-phenyl phases are disclosed.

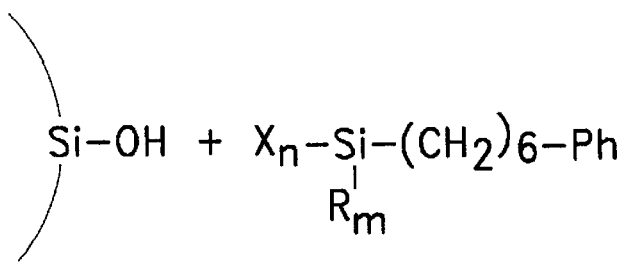

R=CH$_3$ OR OTHER ALKYL GROUPS
AND m=0,1,2

X=Cl  AND  n=3,2,1

SCHEMATIC REPRESENTATION OF THE SYNTHESIS
OF HEXYLPHENYL BONDED SILICA GEL.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–4 are cancelled.

\* \* \* \* \*